US00RE35193E

United States Patent [19]

Shifrin

[11] E Patent Number: Re. 35,193

[45] Reissued Date of Patent: Apr. 2, 1996

[54] COMBINED VISORED CAP TYPE PROTECTIVE HELMET AND POUCH FOR BICYCLISTS OR THE LIKE

[76] Inventor: Roy Shifrin, P.O. Box 5096, Hanover, N.H. 03755

[21] Appl. No.: 296,925

[22] Filed: Aug. 31, 1994

Related U.S. Patent Documents

Reissue of:

[64] Patent No.: 5,173,970
Issued: Dec. 29, 1992
Appl. No.: 820,983
Filed: Jan. 15, 1992

U.S. Applications:

[63] Continuation of Ser. No. 203,026, Feb. 28, 1994, abandoned.

[51] Int. Cl.[6] ..... A42B 3/00

[52] U.S. Cl. ..... 2/410; 2/425; 2/209.12; 224/151

[58] Field of Search ..... 2/12, 196, 177, 2/209.1, 205, 202, 410, 411, 414, 425, 209.11, 209.12; 190/1; 224/151, 153, 202, 257, 258; 383/4

[56] References Cited

U.S. PATENT DOCUMENTS

| | | | |
|---|---|---|---|
| 2,333,987 | 11/1943 | Dawdy | 2/425 |
| 2,694,812 | 11/1954 | Neuborger | 2/209.1 |
| 2,979,170 | 4/1961 | Lotz | 190/1 |
| 3,275,106 | 9/1966 | Rush | 2/209.1 |
| 4,610,038 | 9/1986 | Dennard | 2/209.1 |
| 4,827,537 | 5/1989 | Villa | 2/410 |
| 4,843,642 | 7/1989 | Brower | 2/419 |
| 5,012,533 | 5/1991 | Raffler | 2/425 |

*Primary Examiner*—Michael A. Neas
*Attorney, Agent, or Firm*—Sughrue, Mion, Zinn, Macpeak & Seas

[57] ABSTRACT

A visored cap-type protective helmet for a bicyclist or the like is formed of a spherical fabric head shell defined by an outer fabric body and a matching spherical inner lining. Circumferentially spaced, generally radial fold lines join the outer fabric body to the inner lining and formed circumferentially adjacent, separate, sector shaped, arcuate pockets. Soft protective foam plastic pads sized to and of correspondingly sector shape fill the pockets. A visor integrated to the head shell at a circumferential bottom edge projects outwardly at the front of the helmet. A latching strip having one end fixedly mounted to a pocket at the front of the unit detachably fastens to a pocket at the rear of the head shell to permit the unit to be employed as a pouch for carrying articles and permitting the visor, when folded in, to be captured within the same pocket. A chin strap system is carried by the head shell and additionally an adjustable length shoulder or belt strap for carrying the unit when used as a pouch about the waist of the user or over the shoulder of the wearer. The adjustable length shoulder or belt strap may be carried by the head shell within grooves formed by transversely aligned fold lines between adjacent pockets when not used as a shoulder strap or belt strap.

12 Claims, 4 Drawing Sheets

COMBINED VISORED CAP TYPE PROTECTIVE HELMET AND POUCH FOR BICYCLISTS OR THE LIKE

Matter enclosed in heavy brackets [ ] appears in the original patent but forms no part of this reissue specification; matter printed in italics indicates the additions made by reissue.

*This is a Continuation of application Ser. No. 08/203,026, filed Feb. 28, 1994, now abandoned, which is a re-issue of U.S. Pat. No. 5,173,970, which issued on Dec. 29, 1992.*

FIELD OF THE INVENTION

This invention relates to a helmet made of foam plastic material, and more particularly to a comfortable, attractive cap type protective helmet particularly useful for bicyclists, which functions as a pouch for holding small objects, and which may be attached about the waist, or slung over the shoulder when not worn on the head of the bicyclist.

BACKGROUND OF THE INVENTION

The protective helmets and other head gear have evolved over the years. U.S. Pat. No. 2,333,987 to W. E. Dandy issued on Nov. 9, 1943 is directed to a protective baseball cap formed by a fabric body and a lining with the body and lining forming pockets to opposite sides of the cap with the pockets each carrying a relatively rigid, curved shield member insertable into and removable from the pocket. The protective shield members overlie the sides of the head of the wearer just above the ear.

U.S. Pat. No. 4,827,537 issued May 9, 1989 to Paolo Villa, teaches a protective helmet formed by movable segments of molded plastic, of arcuate form which swings between an expanded operating position and a collapsed non-operating position where the segments nest within themselves. The segments may carry a protective soft foam, plastic foam lining on the inner surface to protect the head of the wearer.

U.S. Pat. No. 4,843,642 issued Jul. 4. 1989 to Richard A. Brower describes a flexible helmet for a tank crewman which includes a unitary impact absorbing pad forming a virtually continuous layer of protection while conforming to the head of the wearer. A yieldable fabric shell carries a one-piece lobster pad formed of a single piece of energy absorbing material cut with lateral indentations to permit it to assume the shape of the wearer's head. The structure includes a chin strap, a nape strap, a crown strap and a brow strap, linked to right and left sound attenuating ear shells and the energy absorbing pad.

U.S. Pat. No. 5,012,533 is directed to a single shell helmet made of foam plastic with the helmet subdivided into shell parts integrated by hinged areas for adopting the helmet to different head sizes through the use of an adjustable strap linking the segments peripherally about the side of the head. A chin strap system maintains the helmet on the head of the wearer.

While such helmets protect the wearer, most protective helmets for bicycling, skating, etc. are all rigid structures. These rigid helmets are uncomfortable to wear, result in excessive perspiration about the head, and are normally produced of non-absorbent material. Further, the helmets are without brims, visor or other sun shading device and are generally unattractive. Additionally, when removed from the head, they are awkward to handle and are of uncomfortable shape, therefore difficult to carry about.

It is therefore a primary object of the present invention to provide a protective cap of a plurality of segmented panels which pivot about folds lines circumferentially between the segmented panels, which may be readily folded in half into a convenient pouch for carrying within this pouch cavity, articles such as sunglasses. gloves, keys, etc., which combined protective cap and pouch may be worn around the waist of the user when not on the head and protecting the same, or may be carried over the shoulder by a shoulder strap.

It is a further object of this invention to provide a combined visored cap type protective helmet and pouch which provides the same protection whether it is worn with the visor to the front or the back, which may be boxed and shipped in folded condition, which is highly attractive, and which is comfortable to the wearer while providing excellent protection to the head of the wearer.

SUMMARY OF THE INVENTION

The invention is directed to a combined visored cap-type protective helmet and pouch for bicyclist or the like. The helmet is comprised of a hollow spherical fabric head shell including an outer fabric body and an integrated inner lining. Circumferentially spaced generally radial fold lines emanate from the center of the head shell, join the outer fabric body to the inner lining and form circumferentially adjacent separate pockets. Soft protective material pads sized and shaped to the pockets are carried therein. The protective material may be hard styrofoam lined with a softer material. A visor integrated to the head shell at a circular bottom edge thereof, at a front of the helmet, projects outwardly of the helmet and extends rearwardly along opposite sides thereof. The fold lines include aligned fold lines running over both sides facilitating folding of the helmet about the aligned transverse fold lines. The foldable front and rear halves of head shell halves define therebetween, an article carrying pouch cavity. Latching means are provided for latching the front and rear halves together to maintain the folded visor internally of the pouch cavity as well as articles placed therein.

The latching means may comprise a flexible strip having one end fixed to the head shell front half and being of a length such that the free end thereof overlaps the head shell rear half across the circular edge thereof. Interengaging fastening means are provided on the free end of the closure strap and the external surface of the head shell rear half. Such fastening means may be interengaging male and female grommet type, snap-engageable fasteners. Alternatively, a surface of the free end of the latching strip may comprise one of a two part hook and loop VELCRO® type fastening system, and the surface of the head shell rear half, may comprise the other part of said hook and loop fastening system. The interengageable fastener means carried by the visor may include one such fastener means earned by the visor, on the top surface thereof, engageable with the fastener means of the latching strip affixed to the head shell front half to maintain the visor in a position generally in the plane of the circular edge of the head shell, and extending at right angles to the axis of the spherical head shell.

A pair of chin straps may be attached to the head shell at opposite sides, and detachably coupled to each other to maintain the cap type protective helmet on the bicyclist. Additionally, the protective helmet may be provided with a belt and shoulder strap system of adjustable length for permitting the combined helmet and pouch to be employed in a pouch mode and suspended from the shoulder of the bicyclist, or belt strapped about the waste of the bicyclist.

The extended length belt and shoulder strap member of the belt and shoulder strap system may be wound over one or more turns, within grooves formed by the fold lines between adjacent pockets on opposite sides of the combined helmet and pouch when the helmet is being worn on the head of the bicyclist. Closure flaps affixed to one of adjacent pockets forming the transverse aligned exterior grooves and sized and positioned to extend across the groove at outer fabric body, may carry disengageable interengaging fastener means for releasably latching a free edge of the flap to the outer fabric body of the pocket to the opposite side of the groove to that which the closure flap other edge is affixed.

The combined protective helmet and pouch may be comprised of a plurality of circumferentially adjacent front pockets and a plurality of circumferentially adjacent rear pockets for respective head shell front and rear halves. The combined helmet and pouch may include a fabric body, a head shell having six pockets, three in the front half and three in the rear half with a front center pocket and a rear center pocket carrying said interengaging latching means.

DESCRIPTION OF THE PREFERRED EMBODIMENT

Figure 1:
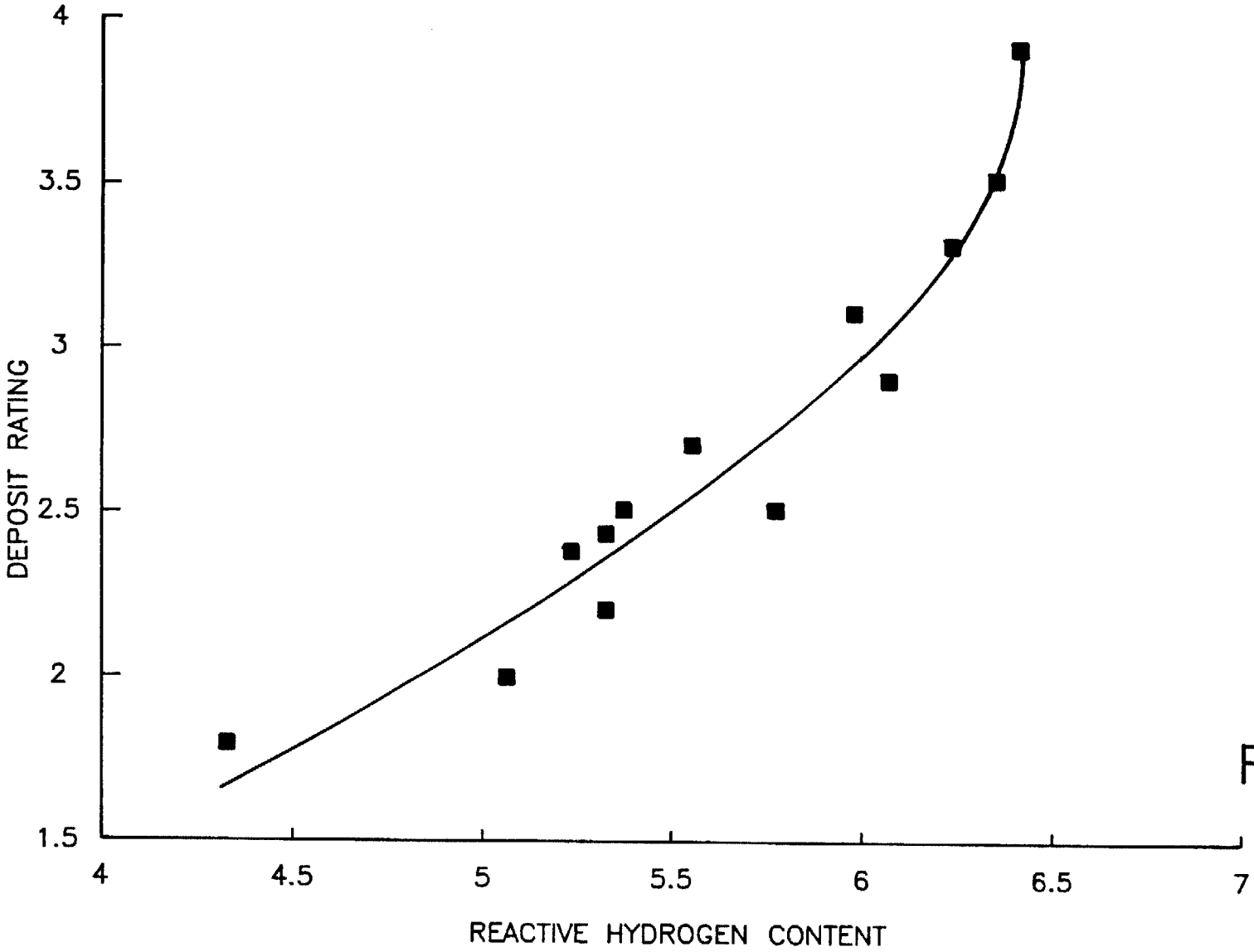
FIG. 1 is a front and right side perspective view of a combined visored cap-type protective helmet and pouch for a bicyclist or the like, forming a preferred embodiment of the invention, with, a chin strap system in normal position, and an adjustable length shoulder and belt strap system stored in aligned transverse grooves between adjacent pockets of the hollow fabric head shell.

Referring the drawings, the combined visor cap-type protective helmet and pouch, which is particularly useful by bicyclist or the like, is indicated general at 10. The combined helmet and pouch 10 is formed partially of a hollow spherical fabric head shell indicated generally at 11, the head shell 11 being formed by a outer fabric body 12 and a integral, inner lining 13, being dome shaped, having a apex 14 at the top, and a circular bottom edge 15.

A plurality of circumferentially spaced, generally radially fold lines as at 16 are formed by sewing together or otherwise attaching the outer fabric body 12 to the inner lining 13, forming a plurality of circumferentially adjacent pockets 17 completely about the hollow hemispheric fabric head shell 11. As seen best in the sectional view of FIG. 4, the pockets 17 each carry internally an arcuate, slightly undersized sector shaped pad 9, formed of a porous framed plastic lightweight, shock absorbing material which is highly resilient and relatively soft. It may be hard styrofoam lined with softer material. Alternatively, the outer peripheral layer of each of the pads 9 as at 9a, FIG. 4 may be relatively rigid. The inner peripheral layer of each pad may be of a softer material so as to cushion the head. The outer layer 9a is in contact with the outer fabric body 12. Pads 9 at the radially inside of each pocket 17, have a radially inner surface thereof in contact with the integral, inner lining 13.

Figure 3:
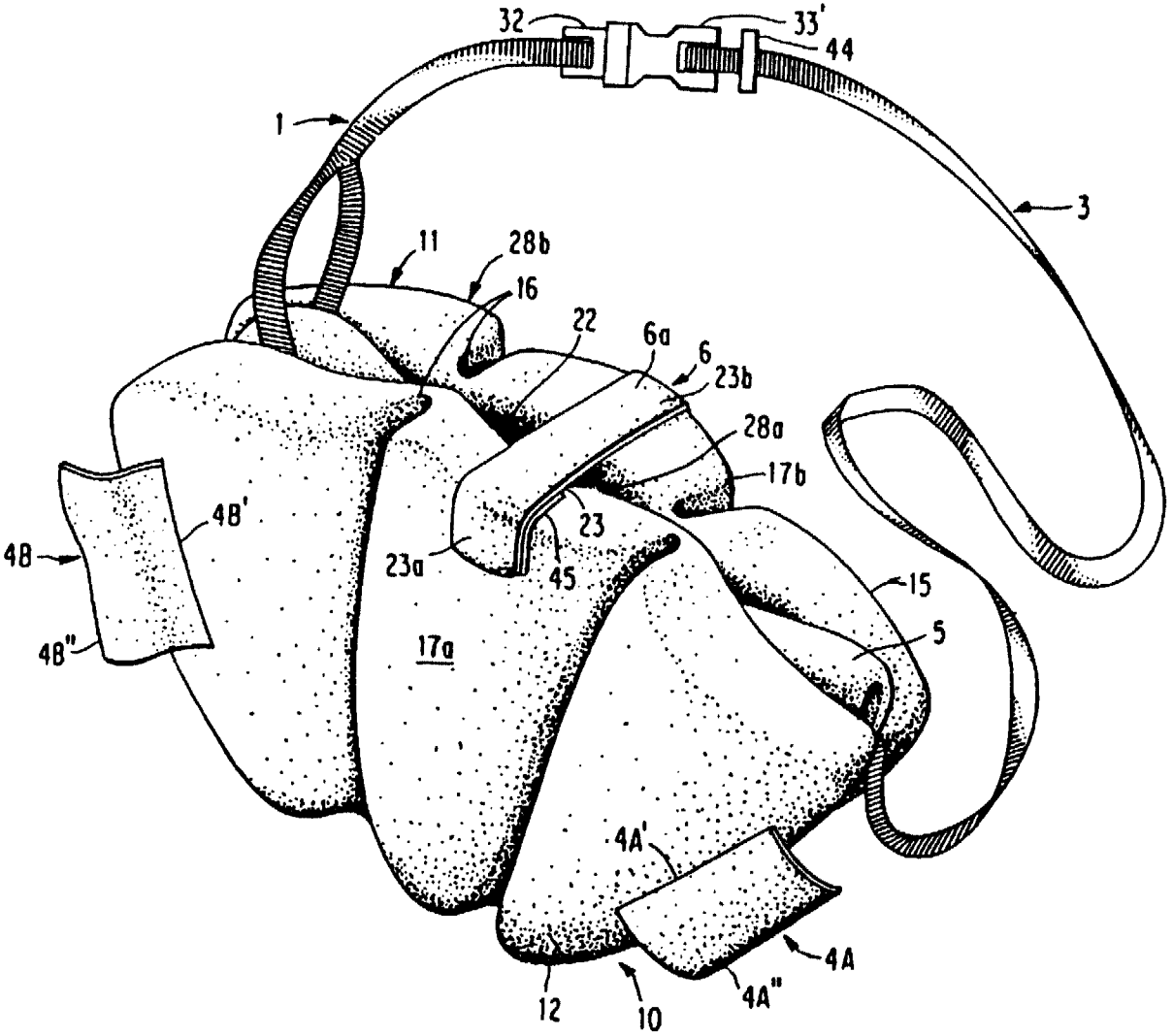
FIG. 3 is a perspective view of the combined visored cap type protective helmet and pouch in a pouch mode, with a latching strip latching folded front and rear head shell halves together and with a folded over visor captured within a pouch cavity formed thereby, and with the belt and shoulder strap system coupled for suspending the pouch from the shoulder of the bicyclist or affixing around the waist.
Figure 4:
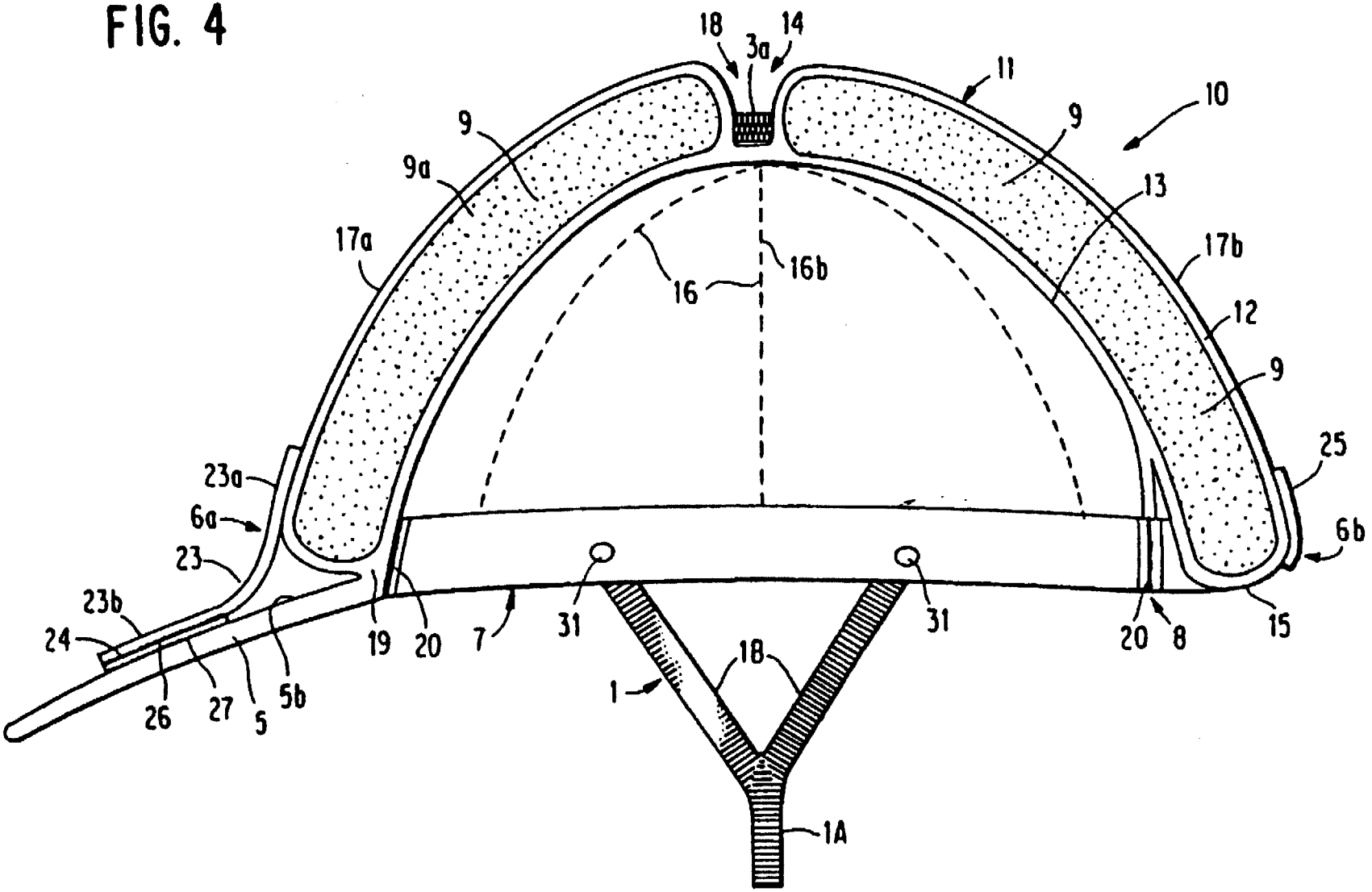
FIG. 4 is a longitudinal sectional view of the combined visored cap-type protective helmet and pouch of FIG. 1, taken about line 4—4.

FIG. 4 also shows the makeup of the fold lines 16 which span some width of the head shell, forming outwardly facing grooves 18 between pockets of the outer fabric body 12 outwardly of the seal connecting that outer fabric body to the inner liner 13. The pads are of the same sector shape as the pockets 17, FIG. 1 and fill the hollow space of the pockets 17 between the radially inner lining 13, and the radially outer fabric body 12. The fold lines 16 as seen from the interior of the hemispheric fabric head shell 11, FIG. 4 are indicated by dotted lines which meet at the apex 14 of the composite spherical fabric head shell 11. A circular inside headband 7 is fixedly mounted by adhesive, sewing or the like to the inner liner 13 and extends completely about the circular bottom edge 15 of the hollow spherical fabric head shell 11. In the illustrated embodiment, an integral visor 5 extends outwardly of the hollow fiber head shell 11 and is integrated to the inner lining 13 as at 19, in the area of the juncture between the headband 7 and the liner. The headband 7 is fixed to the liner 13 by a layer of adhesive 20 on the outer periphery of the endless circular strip form, headband. The visor 5 is of a width, in excess of the width of a given pocket 17 adjacent the bottom circular edge 15 of the combined helmet and pouch 10 and extends well beyond the front pocket 17a. The visor 5 therefore extends partially rearwardly from the front pocket 17a, to both sides thereof. The visors may be formed of a fabric material or a fabric composite including a relatively rigid reinforcing sheet internally of top and bottom fabric layers formed of the same fabric as the outer fabric body 12 of the head shell 11. As such, the visor may be bent or flexed inwardly about the junction of the inner edge 5a of the visor with the bottom edge 15 of the inner lining 13 at 19, during storage, shipping or use of the combined visor cap type protective helmet and pouch 10 as a pouch. Articles may be carried with the folded in visor 5 internally within a pouch cavity 22 defined by front and rear head shell halves indicated generally at 28a, 28b folded about aligned transverse fold lines 16b. FIG. 4, with the combined helmet and pouch 10 turned up side down, as per FIG. 3.

Preferably, the combined visor cap type protective helmet and pouch 10 is formed of six equally sized and equally circumferentially spaced sector shape pockets 17 with three pockets formed within the front head shell half 28a and three pockets 17 within the rear head shell half 28b. Further, a center pocket 17b is centered on the rear head shell half 28b and diametrically opposite a center pocket 17a of the front head shell half.

Figure 2:
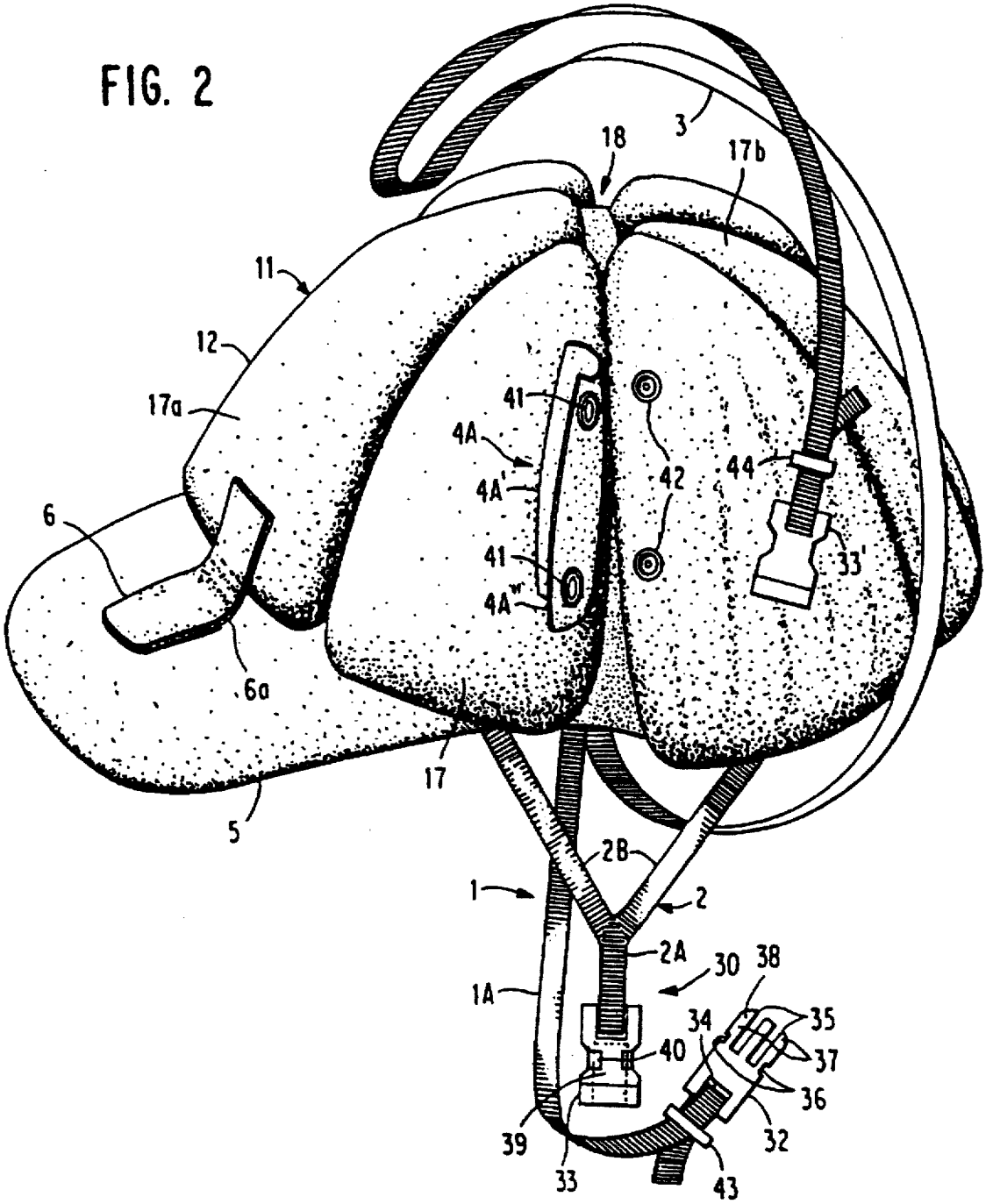
FIG. 2 is a similar prospective view to that of FIG. 1 with the adjustable length shoulder and belt strap unwound, and with the cloth closure flaps open to permit that action.

The front shell half center pocket 17a, carries one component of a latching means indicated generally at 6a which functions to latch the front and rear head shell halves together to maintain the folded over visor 5 internally of cavity 22 as well as any other articles such as a comb, sun glasses or the like placed thereon when the element 10 is being used as a pouch. A companion latching means 6b is provided on the rear central pocket 17b, FIGS. 1 and 4. In the illustrated embodiment, the front latching means component 6a, is formed as a flexible elongated material strip 23 which may be of woven fabric, plastic filing material or the like and which has one end 23a adhesively attached at 45 to the outer surface of the outer surface of pocket 17a. A free end 23b carries on an inner surface thereof a short length strip 24 of one of a loop and hook type fastener material sold commercially under the registered trademark VELCRO®. The two-part fastener means 6, includes a short length strip at 6b of a different hook and loop type fastener material as a companion to the VELCRO material strip 24 which is adhesively adhered at 23 to the outer surface of the outer fabric body center pocket 17b at the rear of the visor cap type protective helmet and pouch 10. FIG. 4. Such VELCRO adhesive fastener system is in itself old in the art but not as employed in this invention. Affixed to the top surface 5b of the visor is a strip 26 of the same type of VELCRO hook and loop fastener material as at 6b positioned so as to face and underly the different type VELCRO fastener material strip 24. The strip 26 is mounted by a thin film of adhesive 27. The purpose of the VELCRO strip 26 is to attach itself to VELCRO strip 24 and to therefore maintain the visor 5 in the slightly oblique position from horizontal as shown in FIGS. 1, 2 and 4. It sets a correct attitude for the visor 5 and at the same time, prevents the free end 23b of the fastener strip 23 from flapping in the breeze.

The structure 10 further includes two strap systems. A first chin strap system, indicated generally at 30, consists of a first and second bifurcated straps 1, 2. Both chin straps 1 and 2 are bifurcated straps having a single free end as at 1A and 2A respectively, and being bifurcated at ends connecting to the spherical hollow head shell 11 as at 1B and 2B respectively. As clearly seen in FIG. 4, in the longitudinal section view, a pair of brads or stitching may attach the free bifurcated ends 1B of strap 1 to the head band 7 at one lateral side of unit 10, the same being true for the bifurcated ends 2B of chin strap 2 in a like manner. The chin strap members 1 and 2, are coupled together by means of conventional male and female interconnecting clip members or clasps 32 and 33 respectively. The male member includes a plastic or metal sheet member having a slot 34 through which the free 1A end of the longer strap member 1 projects, held by member 43 with the ability for lengthening or shortening the position of the male clip 32 on the portion 1A of that strap. Typically, a pair of longitudinal slots 35 are provided within the front end of the male clip 32 and grooves provided at 36 to opposite laterally sides of the clip 32 forming laterally deflectable prongs 37 which have outwardly and rearwardly oblique end surfaces as at 38. This permits penetration of the front end of male clip 32 into a female recess as at 39 of the female clip 33. Recess 39 is formed by two laterally reversibly projecting tabs 40 which project towards each other and outwardly into the recess 39. The projecting tabs 40 are received within grooves 36 within the member 32 lock the male clip 32 to the female clip 33.

Once coupling has been achieved between members 32 and 33, the free end IA of the longer chin strap 1 is pulled tight until the strap is securely tensioned beneath the chin of the wearer. The chin strap makeup is exemplary only of one type of chin strap system which is simple but effective in maintaining the helmet and pouch unit 10 on the head of the bicyclist when placed thereon.

Reference to FIG. 2 shows, yet a third strap indicated generally at 3. In this case, strap 3 is an adjustable length shoulder or belt strap which is much longer than strap 1, but which terminates in an identical female clip 33' to that at 33. The female clip member 38, receives the same male clip member 32 after disconnection from the clip member 33 on the female chin strap 2 of the unit 10. Strap 3 is attached, as is straps 1 and 2, to the head band 7 by brads, rivets or sewn.

Prior to use of the unit as a pouch, whether strapped by bicyclist about the waist, or hung suspended upside down as per FIG. 3 and carried over the shoulder of the bicyclist, the long adjustable length shoulder or belt strap 3 is wrapped about the hollow spherical fabric head shell 11 with the strap laid up within aligned grooves 18 on opposite lateral sides of unit 10 with several turns overlapping as at 3a. FIG. 4, and wound about the exterior of head shell 11. To maintain folded adjustable length shoulder belt strap 3 over or wound about in position within diametrically opposite transversely aligned grooves 18 defined by diametrically opposite seal lines 16b. FIG. 4, cloth flaps at 4A, 4B are employed at opposite sides of the head shell 11 as per FIGS. 1, 2 and 3. The flaps 4A, 4B are of short length, and even narrower width, sewn or adhesively attached along edges 4A', and 4B' only to the head shell outer fabric body 12, while the opposite free edges, when the flap is placed in contact with the exterior surface of the head shell, crosses over slots 18, and extend beyond the respective slots. A pair of male grommets as at 41, and female grommets 42 are respectively affixed to the interior surface of the cloth flaps 4A, 4B along a respective edges 4A", 4B" thereof, and to the edge of the outer fabric body pocket 17 laterally adjacent to the pocket having the cloth flaps 4A, 4B affixed thereto along the respective edges 4A' and 4B'. Grommets may be of cloth "VELCRO" material glued in place. With the male grommets 41 unsnapped to the female grommets 42, the slots 18 are open so that, as per FIG. 2, the strap 3 may be fitted therein in multiple turn lays as per FIG. 4. After laying up the adjustable length shoulder or belt strap 3, the male grommets 41 are snapped into the female grommets 42, securing the unused adjustable length shoulder belt strap 3 in position without interfering with the normal wearing of the helmet by the bicyclist attached to the head and maintain in position by coupling of the chin straps 1 and 2 and taking up the tension by shortening strap 1A.

In that respect, each of the straps 1, 3 adjacent to the male clip members 32, and female clip member 33' of those straps is provided with a collar or a ring as at 43 for strap 1, and 44 for strap 3 permitting the straps 1, 3 to be shortened or loosened as desired. Particularly, strap 3 is required to be adjusted in length to a larger degree since, that strap functions to allow the unit 10 when operating as a pouch, to be worn about the waist of the wearer or to function as a shoulder strap of extended length for suspending the unit as a pouch beneath the arm, with the straps over the shoulder of wearer.

It should be apparent that many changes may be made in the combined visored cap type protective helmet and pouch 10 without departing from the spirit of the invention. In addition to, or as a substitution for, the strap systems 1, 2 and 3, the unit 10 may be provided with a pair of clips (not shown), on the outside surface of the outer fabric body 12, or to the inner lining 13 for simply clipping of the folded unit 10 when functioning as a pouch and holding articles. The straps are shown with either a male clasp or clip, or a female clasp or clip. The straps 1, 2 and 3 may have a female clasp substituted for a male clasp, and visa versa. In the drawings, the adjustable length shoulder or belt strap 3 may be double wrapped over the top of the cap, or may be single wrapped over the top of the cap with the portion of the strap earned internally of the spherical head shell, between the head of the user and the lining.

Conventional means for permitting the cap to adjust to various head sizes including an adjustable length head band 7 is envisioned as an alternative structure for the cap as illustrated and described. The parts other than clips or clasps, the grommets and the pads 9, may be formed of woven fabric, sheets of plastic, or the like. The cloth portions may be sewn together, or may be adhesively joined all, without departing from the invention.

While the present invention has been described and illustrated with respect to a particular embodiment, it should be understood by those skilled in the art of helmet design and construction that the concepts embodied herein may be achieved in a variety of embodiments without departing from the true spirit and scope of the invention.

It is intended, therefore, that the appended claims not be limited to the specific embodiment but rather extended to all variants thereof which are within the scope of this invention as set forth in the appended claims.

I claim:

1. A combined [visored] cap type protective helmet and pouch for bicyclist or the like comprising:

a hollow, spherical fabric head shell [including an outer fabric body integrated to an inner lining], said head shell having a circular bottom edge, and circumferentially spaced, generally radial fold lines [joining said outer fabric body to said inner lining and forming a plurality of circumferentially adjacent separate pockets of sector shape], *sector shaped* soft protective pads of shock absorbing material [sized and shaped to said pockets and fitted therein] *fastened about said fabric head shell,* [a visor integrated to said head shell at said circular bottom edge and at a front of the helmet and projecting outwardly thereof and extending rearwardly along opposite sides thereof,] said [pockets] *sector shaped protective pads* defining laterally aligned transverse fold lines forming foldable front to rear helmet halves and defining an article carrying pouch cavity therebetween, and latching means for latching the front and rear halves together to capture [said visor when folded inwardly about said bottom edge and positioned within said cavity along with] any separate article inserted therein.

2. The combined [visored] cap-type protective helmet and pouch as claimed in claim 1, wherein said latching means comprises a flexible material strip having one end fixed to the helmet front head shell half, and being of a length sufficient to overlap the rear head shell half when the front and rear helmet half are folded together and wherein, the overlapping end of the flexible material strip comprises one type of releasable interengaging fastener means and wherein another second type of releasible interengageable fastener means is mounted on [a pocket of] said rear half of said head shell for coupling to said one type interengaging fastener means.

3. The combined [visored] cap-type protective *helmet and* pouch as claimed in claim 2, wherein, said interengaging fastener means comprises a first, hook-type interengageable fastener strip affixed to one surface of the free end of said flexible material strip and a second, loop type interengageable fastener strip affixed to the [outer fabric body ] *spherical fabric head shell* adjacent said circular bottom edge of said head shell.

4. A combined [visored] cap-type protective helmet and pouch as claimed in claim 3, further comprising *a visor integrated to said head shell at said circular bottom edge and at a front of the helmet and projecting outwardly thereof and extending rearwardly along opposite sides thereof, said visor being foldable inwardly into said pouch, and* a second, loop type interengageable fastener strip on a top of said visor radially outwardly of said circular bottom edge of said head shell and engageable with the interengaging fastener strip of opposite hook type on the free end of the latching strip to maintain the visor in position extending generally perpendicular to the axis of the spherical head shell and in the plane of the circular bottom edge of said head shell.

5. A combined [visored] cap type protective helmet and pouch as claimed in claim 1, further comprising a releasibly securable adjustable chin strap carried by said head shell, for positioning beneath the chin of the wearer.

6. A combined [visored] cap type protective helmet and pouch as claimed in claim 4, further comprising a releasibly securable adjustable chin strap carried by said head shell, for positioning beneath the chin of the wearer.

7. The combined [visored] cap type protective helmet and pouch as claimed in claim *1*, further comprising an adjustable length shoulder/belt strap coupled to said head shell of a length, such that when the front and rear head shell halves are folded together, the unit may be strapped to the waist of the wearer, or suspended over a shoulder of the wearer by said shoulder/belt strap.

8. The combined [visor] cap type protective helmet and pouch, as claimed in claim [1] *7, wherein said hollow, spherical head shell further includes an outer fabric body integrated to an inner lining, said circumferentially spaced, generally radial fold lines join said outer fabric body to said inner lining and form a plurality of circumferentially adjacent separate pockets of sector shape, said soft protective pads are sized and shaped to said pockets and fitted therein, and* wherein the fold lines between the sector shaped pockets include aligned fold lines extending over the top of the outer fabric body and forming aligned grooves between adjacent sector type pads to opposite sides of the head shell, wherein said adjustable length shoulder/belt strap is sized to, and insertably carried within said grooves on the exterior surface of said outer surface body and in a position so as not to interfere with normal wear of the protective helmet and pouch on the head of the bicyclist.

9. The combined [visored] cap-type protective helmet and pouch as claimed in claim 8, further including a pair of cloth flaps having one edge fixed to one of said sector shaped pockets on the exterior surface of the outer fabric body adjacent said grooves, with the flaps extending across respective grooves and having adjacent the opposite edge thereof snap fastening means for fastening said cloth flaps to said laterally adjacent pockets so as to close off said grooves carrying said adjustable length shoulder/belt strap, and preventing the shoulder or belt strap from falling out of said transversely aligned grooves on opposite sides of said head shell during wearing of the combined helmet and pouch.

10. The combined [visor] cap-type protective helmet and pouch, as claimed in claim 9, wherein said snap fastening means comprise interengageable male, and female grommets carried respectively by said flaps and said laterally adjacent pockets.

11. The combined [visor] cap-type protective helmet and pouch as [claim] *claimed* in claim 1, wherein said soft protective shock absorbing material pads comprise foam plastic pads.

12. The combined [visor] cap-type protective helmet and pouch as [claim] *claimed* in claim 11, wherein said foam plastic pads each comprise a soft foam radially inner pad layer and an integral hard radially outer cover[, said cover being in contact with the outer fabric body partially forming the pockets receiving said pads].

* * * * *